W. S. HIETT.
SHINGLE MACHINE.
APPLICATION FILED JAN. 11, 1908.

954,803.

Patented Apr. 12, 1910.
6 SHEETS—SHEET 1.

W. S. HIETT.
SHINGLE MACHINE.
APPLICATION FILED JAN. 11, 1908.

954,803.

Patented Apr. 12, 1910.

5 SHEETS—SHEET 2.

Witnesses
Inventor
W. S. Hiett
By
Attorneys

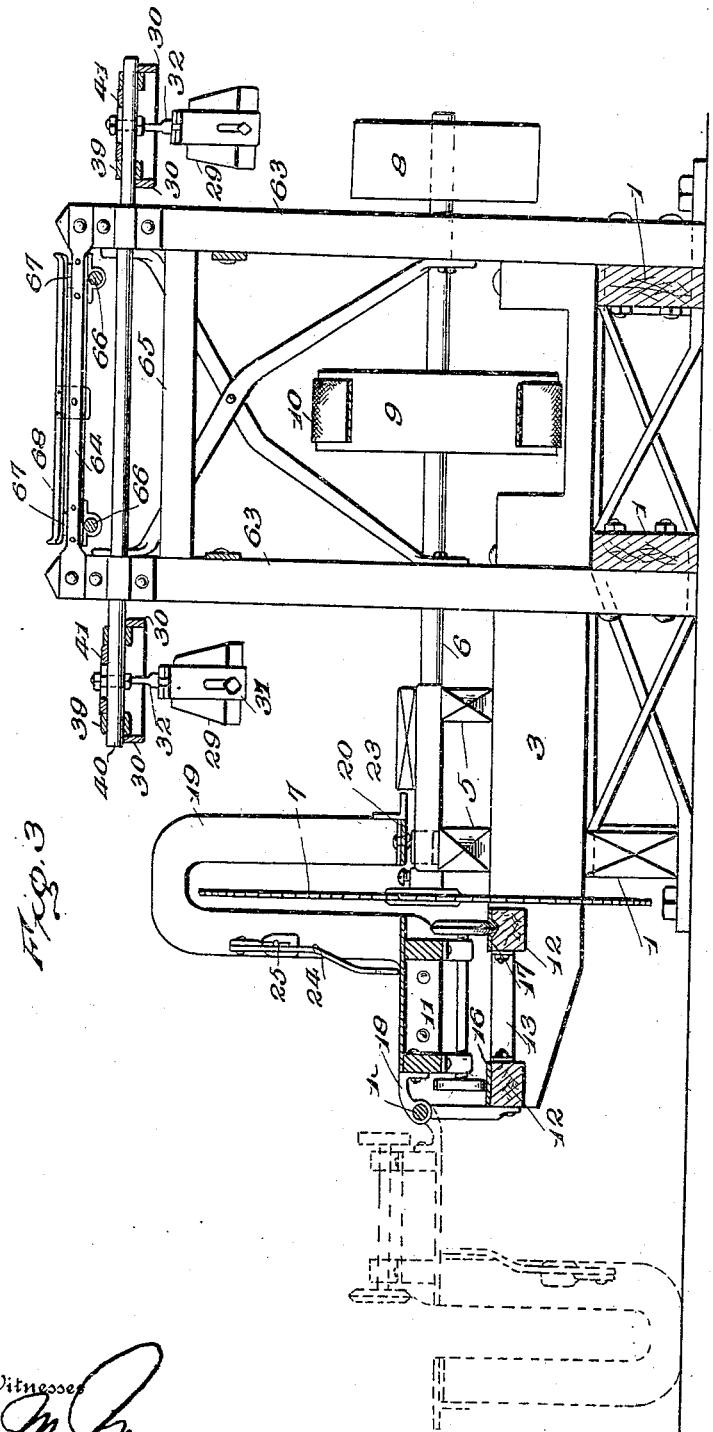

W. S. HIETT.
SHINGLE MACHINE.
APPLICATION FILED JAN. 11, 1908.
954,803.
Patented Apr. 12, 1910.
5 SHEETS—SHEET 4.
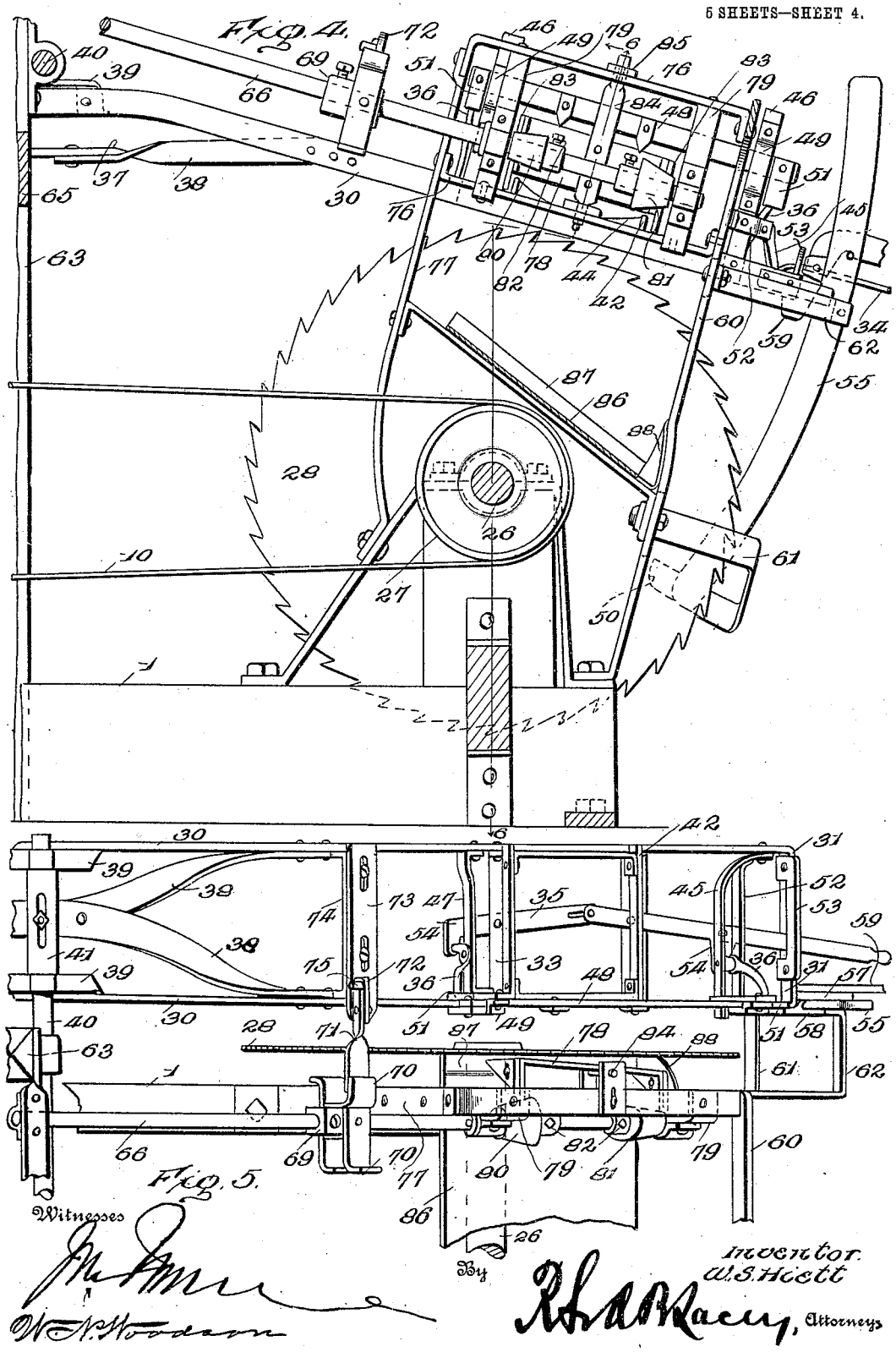

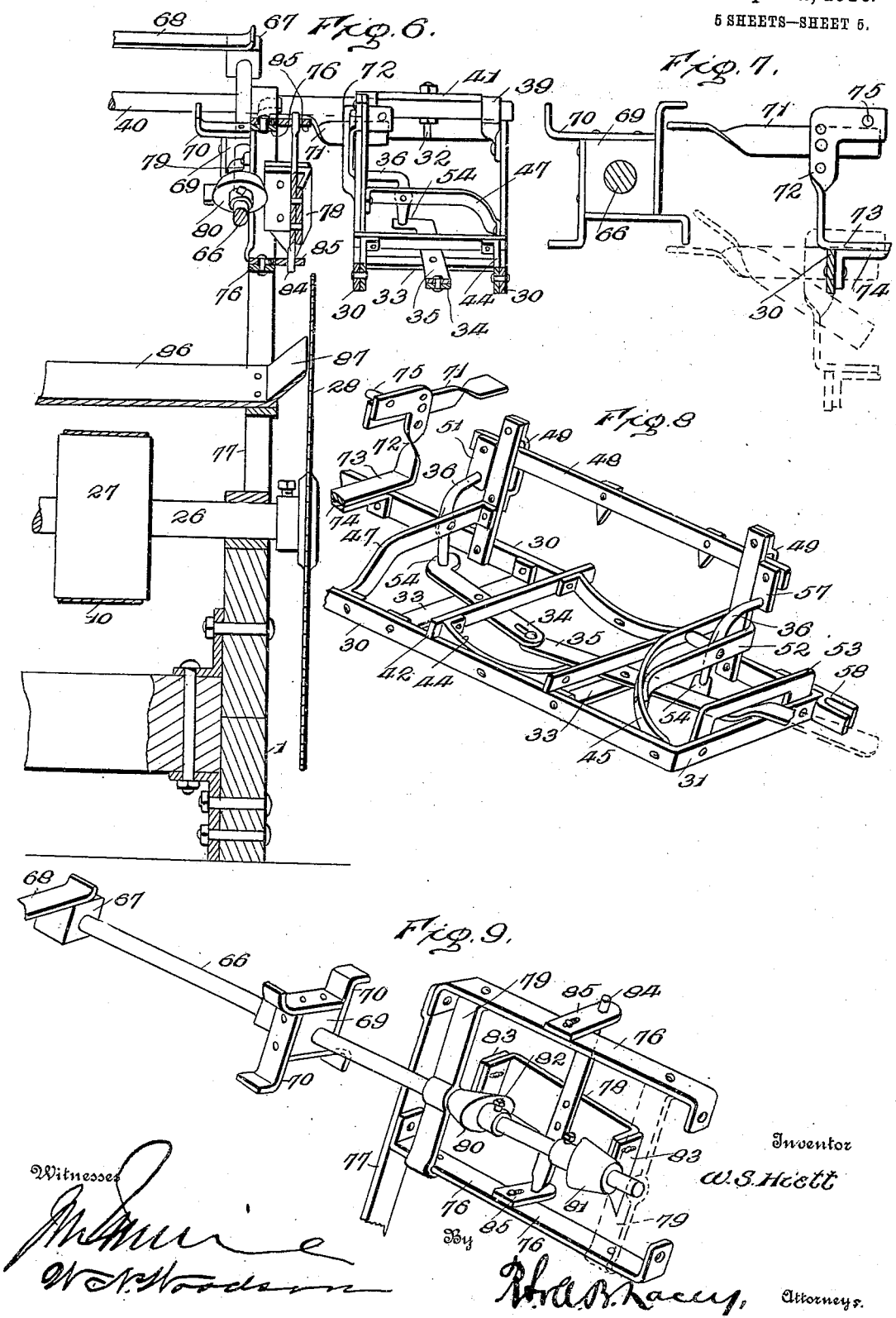

UNITED STATES PATENT OFFICE.

WILLIAM S. HIETT, OF ROCK MART, GEORGIA, ASSIGNOR OF ONE-HALF TO JOHN C. EZZELL, OF ROCK MART, GEORGIA.

SHINGLE-MACHINE.

954,803.  Specification of Letters Patent.  Patented Apr. 12, 1910.

Application filed January 11, 1908.  Serial No. 410,414.

*To all whom it may concern:*

Be it known that I, WILLIAM S. HIETT, citizen of the United States, residing at Rock Mart, in the county of Polk and State of Georgia, have invented certain new and useful Improvements in Shingle-Machines, of which the following is a specification.

The present invention appertains to wood working machinery and more particularly to saw mills for cutting up bolts or blocks of wood into shingles.

The invention provides a machine of the circular saw type and embodying a saw for cutting up logs into bolts or blocks and for splitting said blocks lengthwise and otherwise edging and shaping the same and also embodying a saw for cutting up said bolts or blocks into shingles of the requisite thickness, the parts being compactly arranged with a view to economize space and to reduce the working parts, thereby saving power and materially reducing the expense of maintaining the machine in prime working condition compared with the output or number of shingles produced.

For a full understanding of the invention and the merits thereof and also to acquire a knowledge of the details of construction and the means for effecting the result, reference is to be had to the following description and accompanying drawings.

Figure 1:
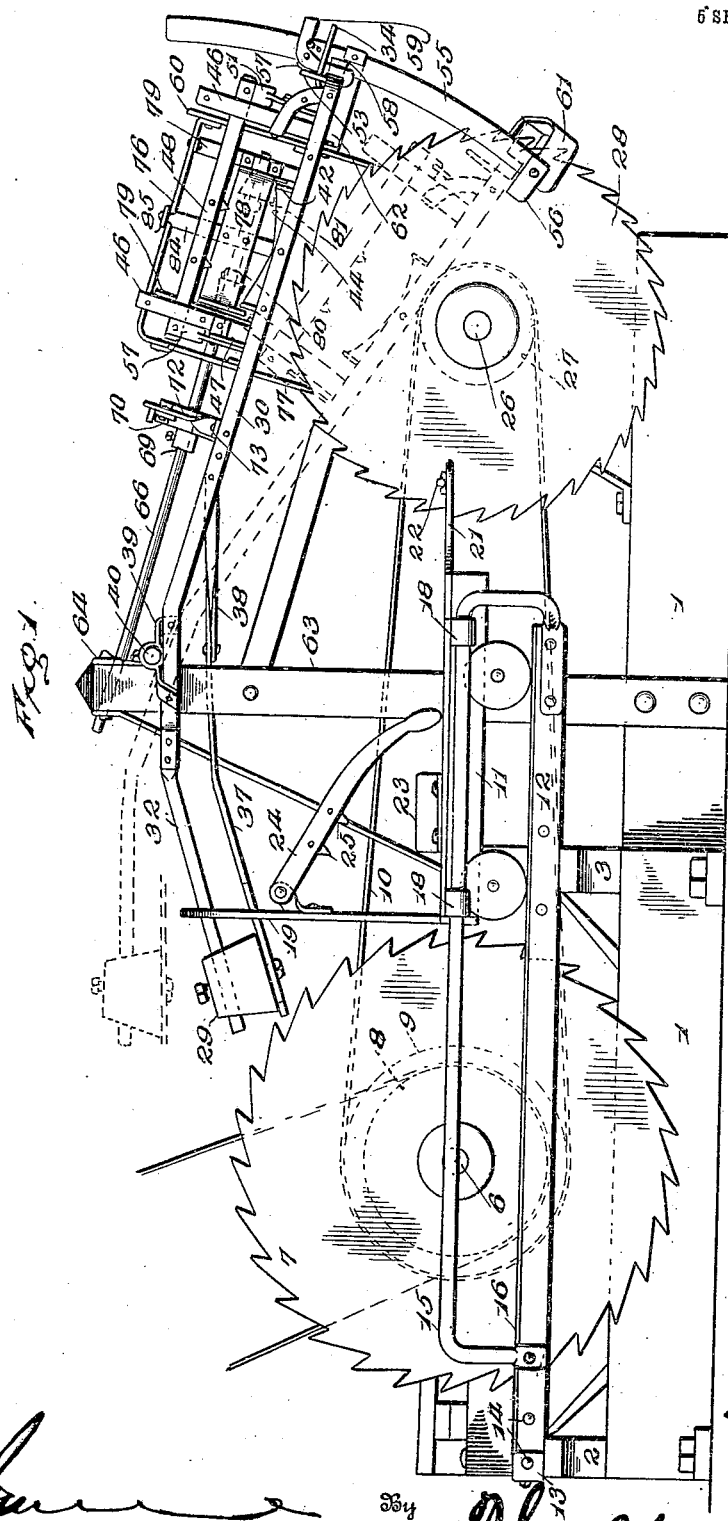
Figure 2:
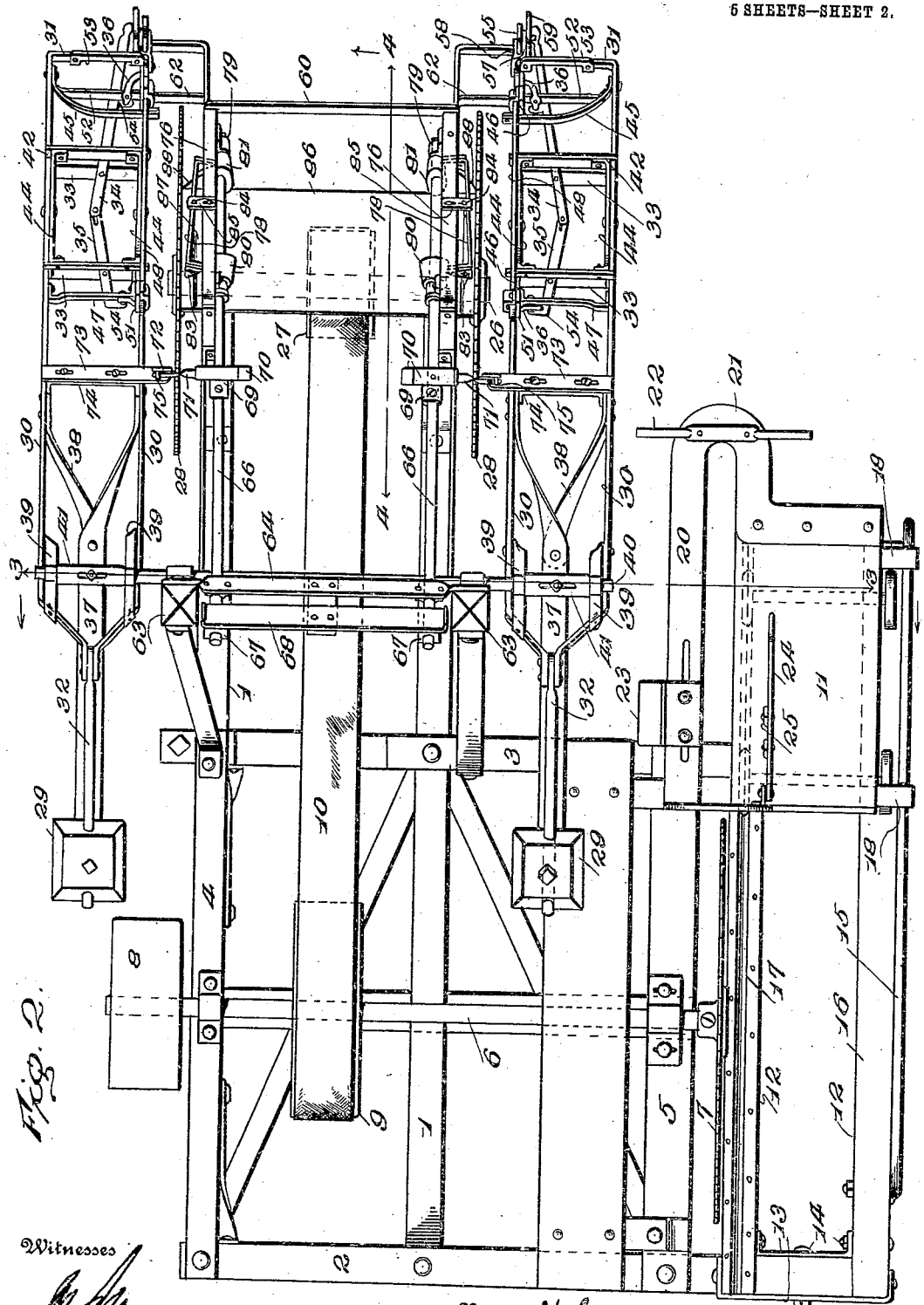

While the invention may be adapted to different forms and conditions by changes in the structure and minor details without departing from the spirit or essential features thereof, still the preferred embodiment is shown in the accompanying drawings, in which:

Figure 1 is a side view of a machine embodying the invention, the dotted lines indicating the position of the shingle carriage when depressed. Fig. 2 is a top plan view of the machine. Fig. 3 is a transverse section on the line 3—3 of Fig. 2, looking in the direction of the arrows. Fig. 4 is a longitudinal section of the machine on the line 4—4 of Fig. 2, showing the parts on a larger scale. Fig. 5 is a top plan view of the parts or portion of the machine shown in Fig. 4. Fig. 6 is a transverse section on the line 6—6 of Fig. 4, looking to the left. Fig. 7 is a detail view on the line 7—7 of Fig. 4, showing the tappet mechanism for operating the shingle block gage. Fig. 8 is a detail perspective view of an end portion of the shingle carriage and bolt cradle. Fig. 9 is a detail perspective view of the shingle block gage and parts intimately associated therewith.

Corresponding and like parts are referred to in the following description and indicated in all the views of the drawings by the same reference characters.

The frame work for supporting the working parts may be of any substantial construction and as illustrated comprises longitudinal timbers 1, transverse timbers 2 and 3 connecting end portions with the longitudinal timbers 1, a longitudinal timber 4 connecting the outer ends of the transverse timbers 2 and 3, and other longitudinal timbers 5 mounted upon the transverse timbers 2 and 3 and secured thereto. The mechanism for cutting up the logs into bolts or blocks is located at one end of the framework, whereas the mechanism for cutting up the bolts or blocks into shingles is arranged at the opposite ends of the framework. The several timbers forming the framework are strengthened and stayed by braces substantially as indicated. A shaft 6 is journaled in bearings applied to the upper longitudinal timbers 5 and is provided at one end with a circular saw 7 and at its opposite end with a band pulley 8 to receive power from a suitable source by means of a drive belt, not shown, in the accustomed manner. A pulley 9 is fast to the shaft 6 at a point between its ends and serves to impart power to the shingle mechanism by means of a drive belt 10. The shaft 6 serves as a mandrel for the saw 7, and is to be driven in any suitable manner as by a belt from a motor to the belt wheel 8.

A frame is mounted upon the projecting end of the transverse timbers 2 and 3 and supports a carriage 11, said frame consisting of longitudinal bars 12 and spaced ties 13 connecting opposite end portions of the bars 12. The longitudinal bars 12 of the carriage are let into mortises formed in the upper edge portions of the projecting ends of the transverse timbers and the ties 13 embrace opposite sides of the parts of said transverse timbers coming between the longitudinal bars and are apertured to receive bolts or fastenings 14. This construction admits of the carriage supporting frame being readily removed from the main frame when desired. A rod 15 forms a guide and has its end portions bent and secured to the outer longitudinal bar 12.

The carriage 11 is mounted to reciprocate upon its supporting frame or the longitudinal bars 12 thereof. The outer truck wheels of the carriage are plane faced and adapted to run upon flat rails 16 secured to the upper side of the outer longitudinal bar 12. The inner truck wheels run upon a grooved rail 17 secured to the top side of the inner longitudinal bar 12, thereby serving to direct the carriage in its reciprocating movements. Strap irons 18, secured at one end to the carriage, embrace the guide rod 15 and act jointly therewith and with the grooved rail 17 and coöperating wheels to prevent possible lateral play of the carriage in its reciprocating movements. The strap irons serve to hingedly connect the carriage with the guide rod 15, thereby admitting of the carriage being thrown upward and outward to be out of the way to admit of access being readily had to the underside thereof, or for any desired purpose. An arch 19 is provided at one end of the carriage 11 and is formed by doubling or folding a bar of metal upon itself. A longitudinal bar 20 extends from the lower end of the leg or member of the arch spaced from the carriage and parallels said carriage and is spaced therefrom. A loop 21 connects the opposite end of the longitudinal bar 20 with the opposite end of the carriage 11 and is provided with a hand bar 22 which is grasped when reciprocating the carriage when cutting up logs into shingle blocks or bolts. The arch 19 forms a rest against which the logs are placed and the longitudinal bar 20 supports one end of the bolts or blocks, thereby preventing the same from dragging or causing lateral strain upon the saw 7. A gage 23 has adjustable connection with the longitudinal bar 20 to regulate the length and size of the bolts or shingle blocks. A lever 24 has pivotal connection with the arch 19 and is provided with teeth 25 to penetrate the logs or blocks to hold the same during the cutting operation. A shaft 26 is mounted in bearings at the end of the framework opposite to the shaft 6 and is provided with a pulley 27 to receive the drive belt 10 by means of which the pulleys 9 and 27 are connected. A circular saw 28 is secured to each end of the shaft 26 and is adapted to cut up the bolt or block into shingles.

Inasmuch as the circular saws 28 coöperate with duplicate mechanisms, a detail description of one of said mechanisms, only, will be given, it being understood that they are similar with the exception that one is right and the other left. Each shingle carriage is mounted to oscillate and carries at one end the bolt cradle which is counterbalanced by means of a weight 29, and at each complete oscillation of the carriage, the bolt or block is moved to bring a portion in position to form the next shingle, the thickness and angle of the shingle being determined by means of a stop, which is likewise oscillated to alternate the inclination of the cuts forming the shingles, said stop being actuated by movement of the shingle carriage. The frame of the shingle carriage consists of longitudinal bars 30 transversely spaced and connected at one end by a cross bar 31 and having their opposite ends bent inward and secured to opposite sides of a bar 32 to the outer end of which the weight 29 is adjustably connected. Cross bars 33 connect longitudinal bars 30 intermediate of their ends and support levers 34 and 35, which extend lengthwise of the frame and have their inner ends loosely connected and their outer ends connected with the vertical bars of elbow levers 36 provided for operating the shingle block grip. A bar 37 is connected at its inner end to one of the longitudinal bars 30 and has its outer end adjustably connected with the weight 29 to steady the same. A brace 38 is connected to the outer longitudinal bar 30 and makes connection with the bar 37 a short distance from the point of attachment of said bar 37 with the bar 30. Bars 39 have their end portions bent in the same direction and secured to the inner end portions of the bars 30 and are provided with bearings which are mounted upon projecting ends of a transverse rod 40. The shingle frame is adjustable upon the rod 40 and is held in the adjusted position by means of a short bar 41 fitted snugly between the bars 39 and adjustably connected to the rod 40. The weight 29 is adjusted on the bar 32 and bar 39 so as to counterbalance the shingle frame and the block or bolt, thereby minimizing the labor and work incident to operating the machine. The bolt cradle is formed of rests 42 which support the bolt or block and consist of transverse bars resting upon the longitudinal bars 30 and secured to the bent ends of longitudinally arranged curved bars 44 secured to the said longitudinal bars 30. A stop 45 engages with one end of the bolt or block to properly position the same and consists of a bar extending transversely of the carriage and inclined or deflected in its length to admit of adjusting the block to change the angle of the cut as each shingle is formed. The stop 45 is elevated with respect to the carriage and the rests 42. Posts 46 project upward from the inner bar 30 and support the shingle block grip and direct the same in its movements. The stop 45 has connection with one of the posts 46 and acts as a brace therefor. A brace 47 performs the same office for the other post 46. The shingle block grip consists of a bar 48 mounted in keepers 49 attached to the upper ends of the posts 46, and teeth or spurs 50 project from the bar 48 and are adapted to enter the bolt or block. The horizontal members of the elbow levers 36 engage extensions 51 in a manner to effect vertical movement of the shingle block grip as said elbow levers are operated. One of the elbow levers 36 is pivoted to the brace 47, and the other elbow lever is mounted upon a pin connecting the stop 45 with a brace 52. The lever 34 is passed through a keeper 53 secured to the cross bar 31, and the projecting end is shaped to provide a convenient trip. The vertical members of elbow levers 36 pass through openings in lateral extensions 54 of the levers 34 and 35. Upon moving the outer end of the lever 35, both levers 34 and 35 are simultaneously moved and through the elbow levers 36 impart a vertical movement to the bar or shingle block grip 48. The shingle carriage may be operated by gripping the projecting end of the lever 34, thereby greatly simplifying the operation and construction, hence one part performs the double office of a grip for a shingle carriage and for the securing means for the bolt or block.

A curved guide 55 is arranged concentric with the axis or rod 40 about which the shingle carriage oscillates, and is provided with a lower stop 56 and an upper stop 57. These stops 56 and 57 limit the movements of the shingle carriage. A projection 58 extended from the outer end of the shingle carriage embraces opposite sides of the curved guide 55 and prevents lateral play of the shingle carriage. This projection also engages with the stops 56 and 57 so as to limit the movement of the shingle carriage in each direction. A catch 59 pivoted to the upper stop 57 is adapted to engage the cross bar 31 of the shingle carriage and hold the same at the limit of its upward movement as when placing a new bolt or block 43 in position. The catch 59 is automatic in operation, but may be thrown out of the way so as not to engage with the shingle carriage in the operation of the shingle. A bracket 60 has the lower ends of its vertical members secured to the longitudinal timbers. Brackets 61 and 62 adjustably connect the curved guide 55 to a vertical member of the bracket.

Posts 63 project vertically from the longitudinal timbers 1 and are connected at their upper ends by means of a cross bar 64 and near their upper ends by means of a cross piece 65, said posts being pressed laterally and stayed lengthwise of the framework. Shafts 66 are journaled near one end in bearings applied to the cross bar 64 and are mounted in bearings at or near their opposite ends applied to frames having connection with the bracket 60. The shafts 66 extend lengthwise of the machine in parallel relation and each is provided with a flat sided stop block 67 arranged to coöperate with a flat spring 68 secured to a projection of the cross bar 64. A tappet is fast to each shaft 66 and consists of a hub 69 and fingers 70 secured to the flat sides of said hub and having their outer or projecting ends grooved to be engaged by a trip 71 mounted upon a shingle frame. The tappet has as many fingers 70 as there are flat sides to the stop block 67. The trip 71 is pivoted to a vertical extension 72 of a bar 73 adjustably connected to a cross bar 74 connecting the longitudinal bars 30. The trip 71 is mounted upon a pivot having adjustable connection with the vertical extension 72 and adapted to be inserted in any one of a series of openings formed in said vertical extension. The vertical extension 72 is provided at its upper end with a curved portion which supports a stop 75 adapted to engage with one end of the trip 71 and limit the movement thereof. Upon the down movement of the shingle carriage, the trip 71 turns upon its pivot connection with the vertical extension 72 so as to clear a finger 70 of the tappet, and upon upward movement of the shingle carriage said trip 71 engages with a finger 70 of the tappet and turns the shaft 66 so as to properly position the stop determining the proper angular position of the bolt or block. As shown, the tappet consists of four fingers 70, and the stop block 67 has four flat sides. The spring 68 bearing upon a flat side of the stop block 67, prevents overmovement of the shaft 66, and insures proper position of said shaft and holds the same to fix the position of the stop when adjusting the shingle block or bolt. Parallel bars 76 are connected at one end to a vertical member of the bracket 60 and are secured to the upper end of an upright bar 77, the several parts forming elements of a frame which receives and supports the shingle stop or gage 78. Vertical bars 79 connect the parallel bars 76 and are provided with bearings in which the end portion of the shaft 66 is mounted.

Cams 80 and 81 are mounted upon the shaft 66 and are arranged so that their opposite ends are set quartering with the result that the shingle stop or gage 78 is operated at each one-quarter turn of the shaft 66. The cams 80 and 81 are of similar formation and taper and are adjustable longitudinally of the shaft 66 and are secured to said shaft in the adjusted position by means of set screws 82 and other means. The shingle stop or gage 78 consists of a plate and is mounted to turn about a centrally disposed vertical axis. The ends of the plate are bent inwardly and are provided with adjustable cross pieces 83 which virtually increase the width of the plate and insure engagement with the shingle block or bolt. A post 84 is connected centrally to the shingle stop or gage 78 and is journaled at its ends in adjustable plates 85 projected outwardly from the parallel bars 76. This post 84 constitutes the axis about which the stop gage 78 oscillates. The cams 80 and 81 engage with the cross pieces 83 and hold the shingle stop and gage 78 in the adjusted position. As the shaft 66 makes a one-quarter turn, the shingle stop or gage 78 moves in one direction to the limit of its throw, and at the next one-quarter turn of the shaft, the stop 78 is moved in the opposite direction to the limit of its throw, thereby properly positioning the shingle bolt or block for each shingle so that the thick end of the shingle is first cut from one end of the bolt and then from the opposite end in alternation. A chute 86 is arranged between the circular saws 28 and inclines outwardly and downwardly to give proper direction to the shingles as the same are cut from the bolt. Clearers 87 are fitted to opposite ends of the chute 86 and incline upwardly and outwardly toward the respective saws 28 so as to engage with the shingles as they are cut and direct the same toward the center of the chute 86 and away from the saws. Deflectors 88 are provided at the lower ends of the clearers 87 and serve to move the shingles toward the center of the chute and prevent their lodging against the uprights or legs of the bracket 60. The chute 86 preferably consists of a metal plate.

When the machine is in operation, the shaft 6 is driven from a suitable source of power and motion is transmitted therefrom to the shaft 26, substantially in the manner herein stated. The logs to be cut up into blocks are placed upon the carriage 11 and are advanced to the saw 7. After the logs are cut up into blocks, the latter are split lengthwise and properly trimmed to form the shingle bolts. The shingle bolts, after being placed upon the rests 42 of the bolt cradle, are secured by means of the shingle block grip 48, the blocks being moved against the stop 78, after which the shingle carriages are moved to advance the blocks to the saws 28 by means of which the shingles are cut from the blocks. The bolt or block is advanced to the saw 28 by pressing downward upon the shingle carriage. After a shingle has been cut from the block and the carriage moved upward, the block is released and moved against the stop or gage 78 to properly position it for cutting the succeeding shingle. On the return stroke of the shingle carriage, the trip 71 engages with one of the fingers 70 of the tappet and imparts a one-quarter turn to the shaft 66, thereby changing the angular position of the stop or gage 78 by means of the cams 80 and 81 so that the next shingle is cut with its thick end at the opposite end of the block. The shaft 66 is given a one-quarter turn at each return stroke of the shingle stop or gage 78 to enable the bolt or block to be properly positioned for the next cut. Both shingle carriages may be manipulated by a single operator by grasping the outer end of the levers 34 and moving the same vertically to swing the shingle carriages and laterally to release and secure the bolts or blocks.

Having thus described the invention, what is claimed as new is:

1. In a shingle sawing machine, a rotary cutter, a swinging frame pivoted to move in a plane parallel with but to one side of the plane of the cutter, a bolt cradle on the end of the frame adjacent to the cutter, a vertically movable horizontally extending gripping bar, vertical guides on the cradle in which said bar moves, a lever pivotally mounted on the cradle for horizontal movement but held from independent vertical movement, and connections between said lever and the gripping bar for moving the latter vertically when the lever is moved horizontally, the end of said lever projecting out from the cradle and forming a means whereby the swinging frame may be raised or lowered.

2. In a shingle sawing machine, a cutter, a frame pivotally mounted to move in a vertical plane parallel with but to one side of the plane of the cutter, a bolt cradle on the end of the frame adjacent to the cutter, a bolt gripping bar, vertical guides carried upon the cradle in which said bolt gripping bar vertically moves, toggle levers supported upon the cradle, opposed bell cranks, one leg of each of which is connected to the gripping bar and the other to one of the toggle levers, and a handle on one of the toggle levers projecting out from the end of the cradle and forming also means whereby the frame may be swung vertically.

3. In a shingle sawing machine, a cutter, a frame pivotally mounted to move in a vertical plane parallel with but to one side of the cutter, said frame comprising opposed longitudinal bars, transverse bars located at the end of said frame adjacent to the cutter, said bars forming a cradle upon which the bolt is to be supported, vertical bars carried upon one of the frame bars adjacent to the cradle, guides attached to the vertical bars, a longitudinally extending bolt gripping bar carried in the guides thus formed, transverse bars attached to the vertical bars and extending to the opposite frame bar at a height above the transverse cradle bars, bell crank levers pivoted to said first named transverse bars, one end of each of the bell crank levers being connected to the bolt gripping bar, toggle levers connected to each other, the lower end of each bell crank lever being engaged with one of the toggle levers, one of the toggle levers having an extension forming a handle, a transverse horizontal guiding bar beneath which said handle passes permitting a horizontal movement of the handle but preventing an independent vertical movement thereof, and a transverse curved stop bar mounted on the frame bars adjacent to the transverse cradle bars against which the shingle bolt is placed.

In testimony whereof I affix my signature in presence of two witnesses.

WILLIAM S. HIETT. [L. S.]

Witnesses:
M. E. MUNDY,
I. F. MUNDY.